US012651813B2

(12) United States Patent　　　　(10) Patent No.:　US 12,651,813 B2
George et al.　　　　　　　　　　　(45) Date of Patent:　　Jun. 9, 2026

(54) SYSTEMS AND METHODS FOR BATTERY ARCHITECTURE

(71) Applicant: Rivian IP Holdings, LLC, Plymouth, MI (US)

(72) Inventors: Sunoj Cherian George, Irvine, CA (US); Baojin Wang, San Marcos, CA (US); Todd Adams Putnam, Mammoth Lakes, CA (US); Kyle Lobo, Westchester, CA (US); Charles John Scanlon, Culver City, CA (US); Brian Joseph Ciaverella, San Pedro, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 669 days.

(21) Appl. No.: 18/060,152

(22) Filed: Nov. 30, 2022

(65) Prior Publication Data

US 2024/0178534 A1　　May 30, 2024

(51) Int. Cl.
H01M 50/581　　(2021.01)
B60L 3/00　　　(2019.01)
B60L 3/04　　　(2006.01)
H01M 10/42　　(2006.01)

(52) U.S. Cl.
CPC ......... H01M 50/581 (2021.01); B60L 3/0046 (2013.01); B60L 3/04 (2013.01); H01M 10/425 (2013.01); H01M 2200/103 (2013.01); H01M 2220/20 (2013.01)

(58) Field of Classification Search
None
See application file for complete search history.

(56) References Cited

U.S. PATENT DOCUMENTS

| | | | |
|---|---|---|---|
| 2019/0372067 A1* | 12/2019 | Fieldbinder | ......... H01M 10/441 |
| 2021/0050582 A1* | 2/2021 | Yoshida | ............. H01M 50/209 |
| 2022/0158314 A1* | 5/2022 | Krieg | .................. H01M 50/569 |
| 2022/0407307 A1* | 12/2022 | Putnam | ................... H02H 7/18 |
| 2023/0027996 A1* | 1/2023 | Fritz | ........................ B60L 3/04 |
| 2023/0043802 A1* | 2/2023 | Baba | ...................... B60L 3/0046 |
| 2023/0207241 A1* | 6/2023 | Yoneda | .................. H01H 37/76 |
| 2023/0286388 A1* | 9/2023 | Prasad | .................... B60L 58/15 |
| 2023/0335870 A1* | 10/2023 | Atluri | .................. B60L 3/0046 |
| 2024/0162727 A1* | 5/2024 | Namuduri | ........... H01M 50/583 |

FOREIGN PATENT DOCUMENTS

| | | |
|---|---|---|
| DE | 10 2012 213 926 A1 | 2/2014 |
| DE | 10 2014 206 270 A1 | 4/2014 |
| DE | 10 2018 204 000 A1 | 9/2018 |
| DE | 10 2017 011 040 A1 | 5/2019 |
| DE | 10 2022 119 735 A1 | 3/2023 |

OTHER PUBLICATIONS

German Office Action on DE Appl. No. 102023122502.2 dated Jan. 26, 2026, with machine translation.

* cited by examiner

*Primary Examiner* — Scott J. Chmielecki
(74) *Attorney, Agent, or Firm* — Foley & Lardner LLP

(57)　　　　　　　ABSTRACT

Systems and methods for a battery architecture include a first fuse connected between a first battery cell and a second battery cell of a battery pack, and a second fuse connected between the second battery cell and a terminal of a charge port.

19 Claims, 8 Drawing Sheets

700

705 Provide a First Fuse

710 Provide a Second Fuse

800

805 Identify an Event

810 Send Signal to Fuse of Battery System

SYSTEMS AND METHODS FOR BATTERY ARCHITECTURE

INTRODUCTION

Electric vehicles have a battery system that delivers power to various electrical components of the electric vehicle.

SUMMARY

A battery architecture as described herein can include a positive contactor or switch, while omitting a negative contactor or switch. The battery architecture can include a first and second fuse (e.g., pyrofuses), where the first fuse is coupled between arrays of battery cells (e.g., including a first battery cell of a first array of battery cells and a second battery cell of a second array of battery cells) within a battery pack (e.g., in series with a manual service disconnect for the battery pack) and the second fuse is coupled to a negative terminal of the battery pack, such as at the location where the main negative switch would be located. During normal operation, a battery management system (BMS) can selectively open or close the positive contactor to connect or disconnect the battery pack from the vehicle high voltage components. In response to various detected events, the BMS (or a controller for the battery system) can activate one or more of the fuses and open the positive contactor so that various capacitances and power can dissipate within the battery architecture.

At least one aspect is directed to a system. The system can include a first fuse connected between a first battery cell and a second battery cell of a battery pack. The system can include a second fuse connected between the second battery cell and a terminal of a charge port.

At least one aspect is directed to a method. The method can include providing a first fuse in connection with a first battery cell and a second battery cell of a battery pack. The method can include providing a second fuse in connection between the second battery cell and a terminal of a charge port.

At least one aspect is directed to a vehicle. The vehicle can include a battery pack including a first battery cell and a second battery cell. The vehicle can include a first fuse connected between the first battery cell and the second battery cell. The vehicle can include a second fuse connected between the second battery cell and a negative terminal of a charge port.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
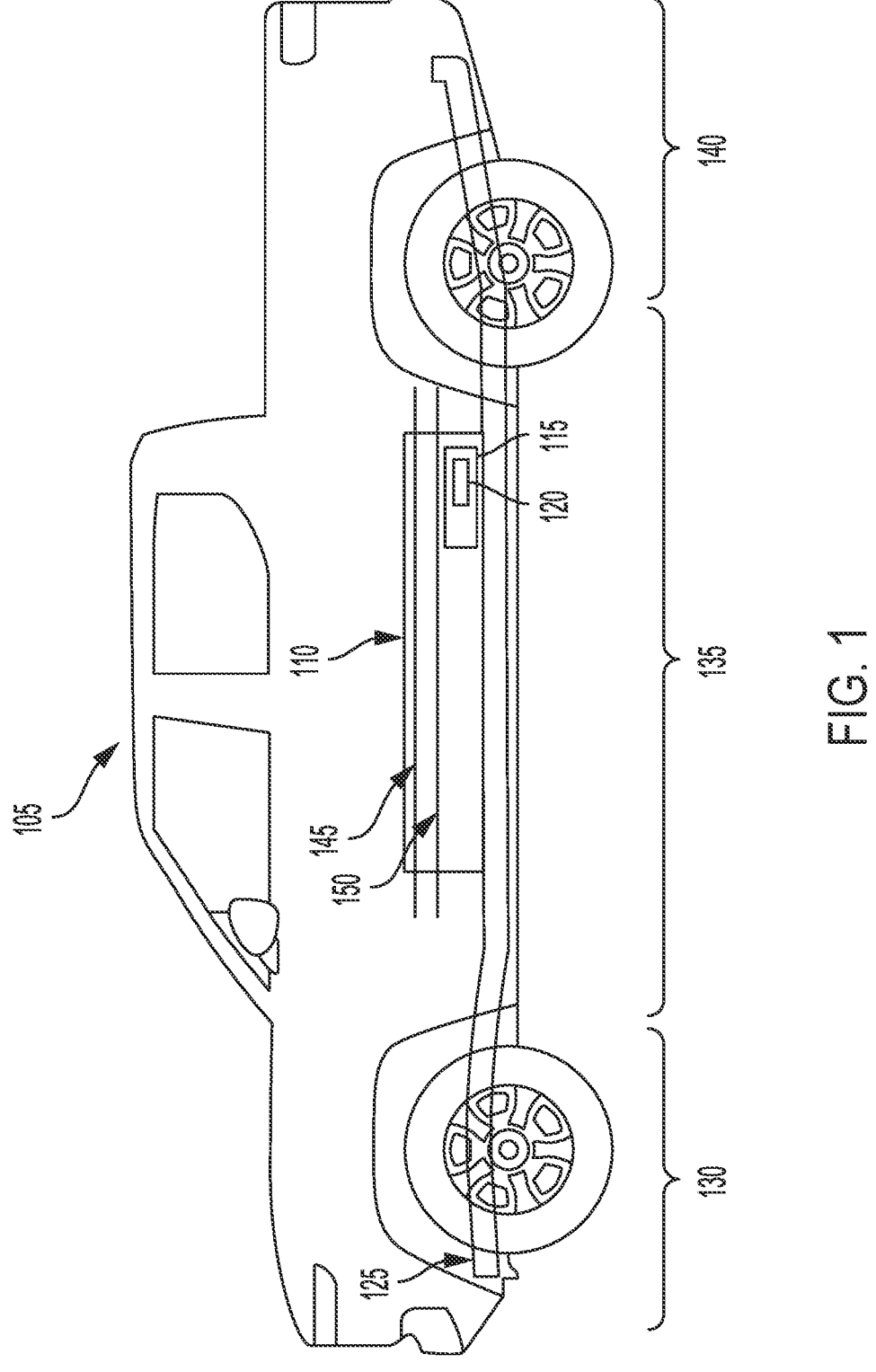
FIG. 1 depicts an example electric vehicle.

Following below are more detailed descriptions of various concepts related to, and implementations of, methods, apparatuses, and systems of an electric vehicle battery architecture. The various concepts introduced above and discussed in greater detail below may be implemented in any of numerous ways.

The present disclosure is directed to an electric vehicle (EV) battery architecture. Some EV battery architectures can include main negative and main positive contact switches, which connect a battery pack to a charge port. The main positive and main negative contact switches add weight to the EV, consume a relatively large space, have a high contact resistance which can cause increased temperature conditions within the architecture, and increase cost of the battery architecture.

To solve these and other technical challenges, proposed herein is a battery architecture which removes one of the positive or negative contact switches, and incorporates additional components which monitor and react to various battery architecture and EV states or events. The battery architecture provided can lead to better controllability, cost realization, thermal performance, and event-based mode mitigation.

The battery architecture described herein can include a positive contactor or main positive switch, while omitting a negative contactor or main negative switch. The battery architecture can include a first fuse and a second fuse (e.g., pyrofuses), where the first fuse is coupled in between a first battery cell and a second battery cell of a battery pack (e.g., in series with a manual service disconnect for the battery pack) and the second fuse is coupled to a negative terminal of the battery pack. During normal operation, a battery management system (BMS) can selectively open or close the positive contactor to connect or disconnect the battery pack from the charge port. Voltage levels can be maintained below a threshold voltage (such as 60 VDC) using the drive unit's backup DC/DC converter while the vehicle high voltage (HV) direct current (DC) bus is not energized. In response to various detected events, the BMS can activate one or more of the fuses and open the positive contactor so that various capacitors and power can dissipate within the battery architecture. For example, in response to an acceleration event, the BMS or other controller can activate the fuses and open the positive contactor, and control the DC/DC converter or motor inverter to actively discharge one or more capacitors of the battery system. As another example, in response to a high load event, the BMS or other controller can activate the fuses and open the positive contactor, and control the DC/DC converter or motor inverter to actively discharge one or more capacitors of the battery system. As another example, in response to a main contactor event, the BMS or other controller can activate the fuses prior to the BMS or controller entering a sleep mode or otherwise losing control of a power supply. As yet another example, during a service event, such as upon removal of a manual service disconnect, the BMS can control an isolation detection circuit to discharge some capacitors of the battery system while also controlling the DC/DC converter or motor inverter to actively discharge other capacitor, thus de-energizing a high-voltage bus of the battery system.

With this technical solution, the main negative switch can be removed, thus realizing the controllability, cost realization, and thermal performance benefits. Furthermore, by including the first and second fuse, the battery architecture can be controlled (e.g., by controlling the corresponding fuses) to dissipate power responsive to various detected events or triggers.

FIG. 1 depicts an example electric vehicle 105 installed with at least one battery pack 110. The electric vehicle 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. The electric vehicle 105 can be fully electric or partially electric (e.g., plug-in hybrid) and further, the electric vehicle 105 can be fully autonomous, partially autonomous, or unmanned. The electric vehicle 105 can also be human operated or non-autonomous. The electric vehicle 105 such as electric trucks or automobiles can include on-board battery packs such as the battery pack 110, which can include batteries or battery module 115, or battery cell 120 to power the electric vehicle. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, a first busbar 145 and a second busbar 150 can include electrically conductive material(s) to connect or otherwise electrically couple the battery modules 115, or the battery cells 120 with other electrical components of the electric vehicle 105 to provide electrical power to various systems or components of the electric vehicle.

Figure 2A:
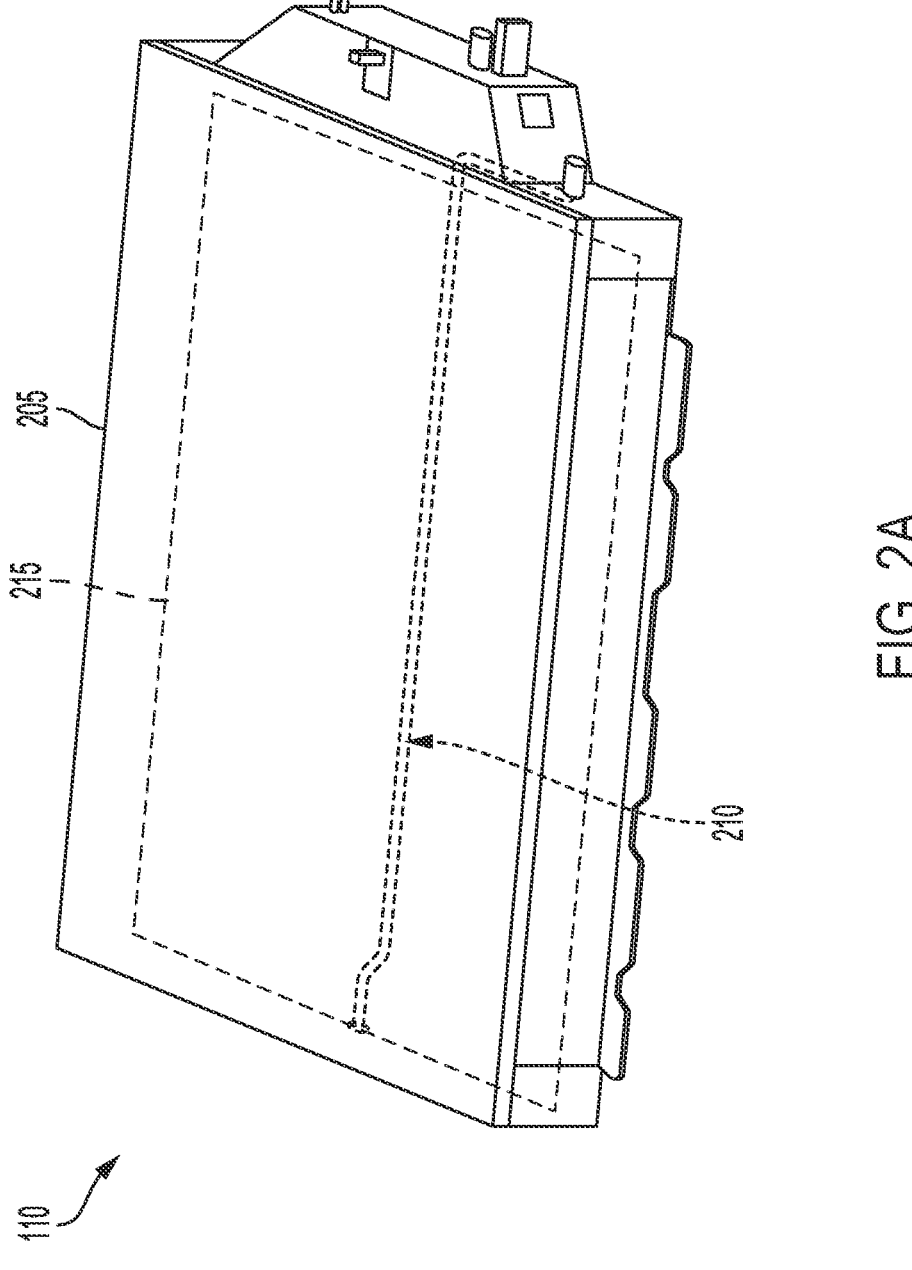
FIG. 2A depicts an example battery pack for the electric vehicle of FIG. 1.

FIG. 2A depicts an example of the battery pack 110. The battery pack 110 can provide power to the electric vehicle 105. The battery pack 110 can include any arrangement or network of electrical, electronic, mechanical or electromechanical devices to power a vehicle of any type, such as the electric vehicle 105. The battery pack 110 can include at least one housing 205. The housing 205 can include at least one of the battery module 115 or at least one of the battery cell 120, as well as other battery pack 110 components. The battery module 115 can be or can include one or more groups of prismatic cells, cylindrical cells, pouch cells, or other form factors of the battery cell 120. The housing 205 can include a shield on the bottom or underneath the battery module 115 to protect the battery module 115 and/or the battery cell 120 from external conditions, for example if the electric vehicle 105 is driven over rough terrains (e.g., off-road, trenches, rocks, etc.) The battery pack 110 can include at least one cooling line 210 that can distribute fluid (or other type of coolant) through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of the thermal component 215. For example, there can be one or more of the thermal component 215 in each of the battery pack 110, or in each of the battery module 115. At least one of the cooling line 210 can be coupled with, part of, or independent from the thermal component 215.

Figure 2B:
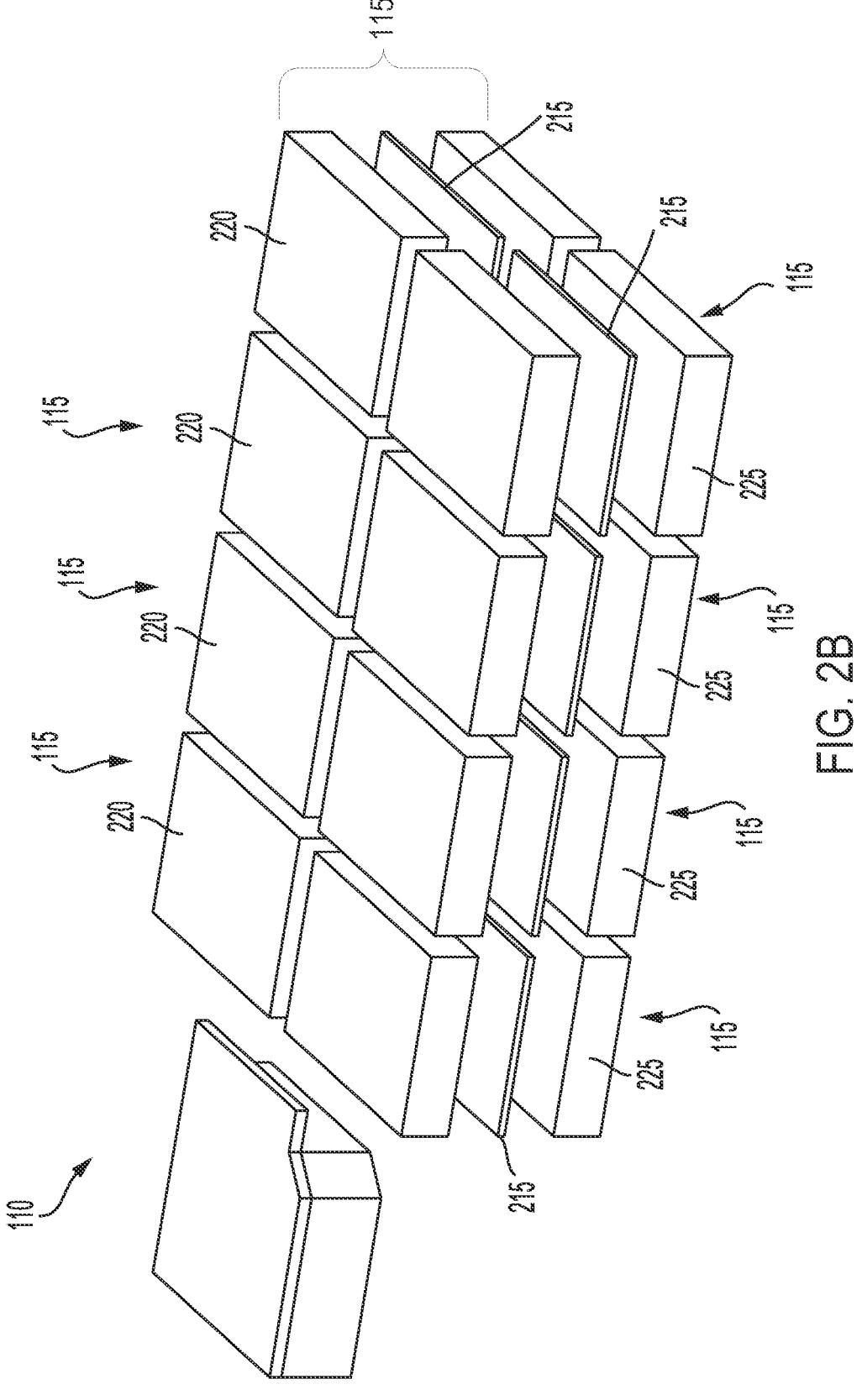
FIG. 2B depicts a battery module of the battery pack of FIG. 2A.

FIG. 2B depicts an example of a plurality of battery modules (e.g., the battery module 115). Each of the battery module 115 can include at least one submodule. For example, the battery module 115 can include at least one first (e.g., top) submodule 220 or at least one second (e.g., bottom) submodule 225. A thermal component 215 can be disposed between the top submodule 220 and the bottom submodule 225 for heat exchange. The thermal component 215 can be disposed or thermally coupled between the top submodule 220 and the bottom submodule 225 of the battery module 115. The thermal component 215 can also be thermally coupled with more than one battery module 115, such as across two battery modules 115. The thermal component 215 can also be thermally coupled with or more than two submodules 220, 225. The thermal components 215 shown adjacent to each other across two instances of the battery module 115 can be combined into a single instance of the thermal component 215 that spans the size of one or more of the top submodule 220 or the bottom submodule 225. The thermal component 215 can be positioned underneath the top submodule 220 and over the bottom submodule 225, in between the top submodule 220 and the bottom submodule 225, on one or more sides of top and bottom submodules 220, 225, among other possibilities. The thermal component 215 can be disposed in sidewalls, cross members, structural beams, among various other components of the battery pack, such as battery pack 110 described above. The top and bottom submodule 220, 225 (together with the thermal component 215) can collectively form one battery module 115. In some examples, each submodule 220, 225 can be considered as a complete battery module 115, rather than a submodule.

Each of the battery module 115 can each include a plurality of the battery cells 120. The battery modules 115 can be disposed within the housing 205 of the battery pack 110. The battery cell 120 can be cylindrical cells or prismatic cells, for example. The battery module 115 can operate as a modular unit of battery cells 120. For example, the battery module 115 can collect current or electrical power from the battery cells 120 that are included in the battery module 115.

The battery module 115 can provide the current or electrical power as output from the battery pack 110. The battery pack 110 can include any number of battery modules 115. For example, the battery pack 110 can have one, two, three, four, five, six, seven, eight, nine, ten, eleven, twelve or other number of battery modules 115 disposed in the housing 205. It should also be noted that each battery module 115 can include a top submodule 220 and a bottom submodule 225, possibly with a thermal component 215 in between the top submodule 220 and the bottom submodule 225. The battery pack 110 can include or define a plurality of areas for positioning of the battery module 115 and/or battery cells 120. The battery modules 115 can be square, rectangular, circular, triangular, symmetrical, or asymmetrical. In some examples, battery modules 115 can be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without the top and bottom submodules 220, 225. The battery cells 120 can be disposed in the battery pack 110 in a cell-to-pack configuration without to top and bottom submodules 220, 225, among other possibilities.

Figure 3:
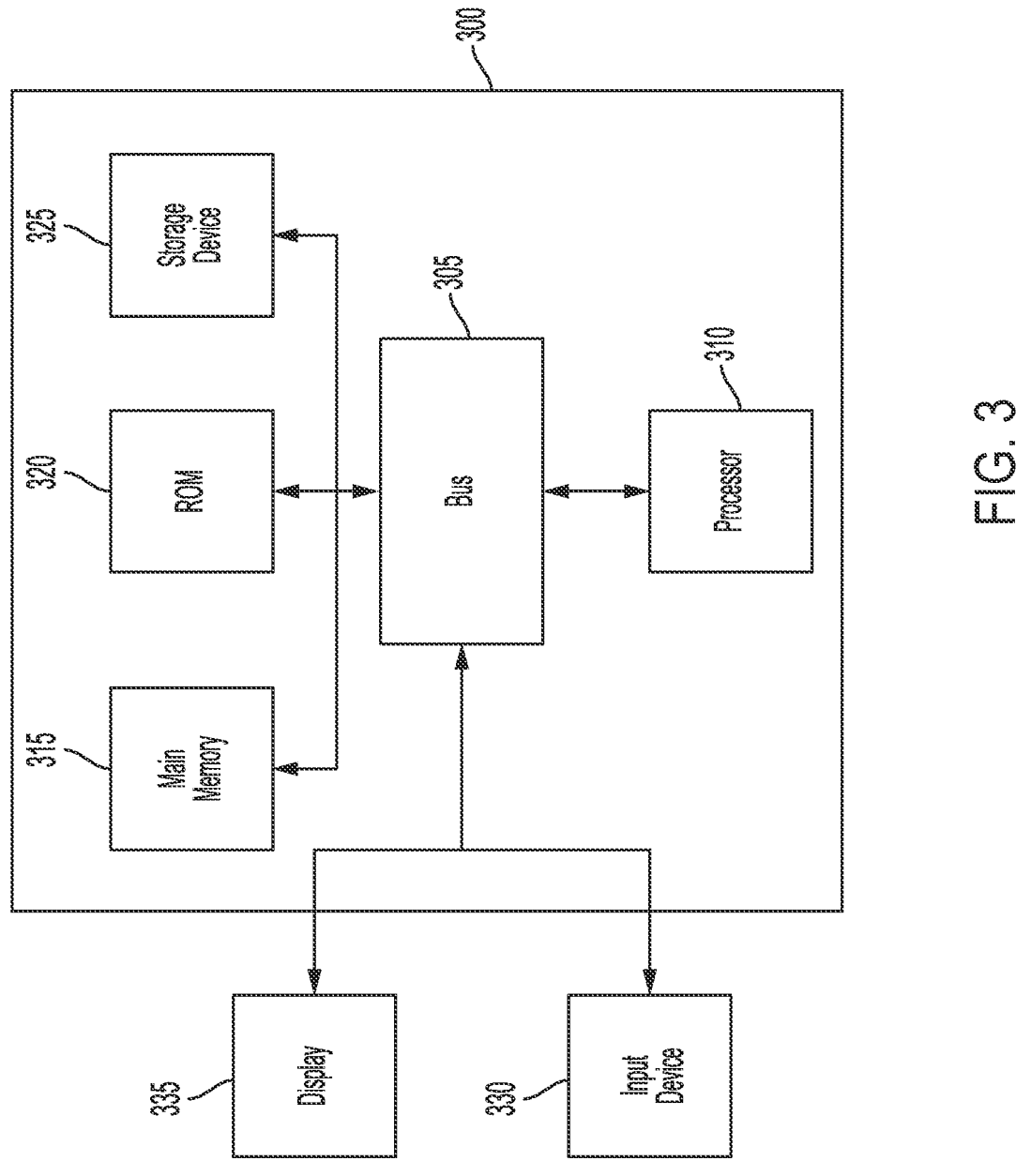
FIG. 3 is an example block diagram illustrating an architecture for a computer system that can be employed to implement elements of the systems and methods described and illustrated herein.

FIG. 3 depicts an example block diagram of an example computing system 300 (or computer, computing device, or computer system). The computing system 300 can include or be used to implement a data processing system or its components. The computing system 300 includes at least one bus 305, or other communication component, for communicating information. The computing system 300 includes at least one processor 310 or processing circuit coupled to the bus 305 for processing information. The computing system 300 also includes at least one main memory 315, such as a random access memory (RAM) or other dynamic storage device, coupled to the bus 305 for storing information, and instructions to be executed by the processor 310. The main memory 315 can be used for storing information during execution of instructions by the processor 310. The computing system 300 can further include at least one read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions.

The computing system 300 can be coupled via the bus 305 to a display 335, such as a liquid crystal display, or active matrix display, for displaying information to a user, such as a driver of the electric vehicle 105 or other end user. An input device 330, such as a keyboard or voice interface, can be coupled to the bus 305 for communicating information and commands to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the display 335.

The processes, systems and methods described herein can be implemented by the computing system 300 in response to the processor 310 executing an arrangement of instructions contained in the main memory 315. Such instructions can be read into the main memory 315 from another computer-readable medium, such as the storage device 325. Execution of the arrangement of instructions contained in the main memory 315 causes the computing system 300 to perform the illustrative processes described herein. One or more processors (which can include the processor 310) in a multi-processing arrangement can also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

Figure 4:
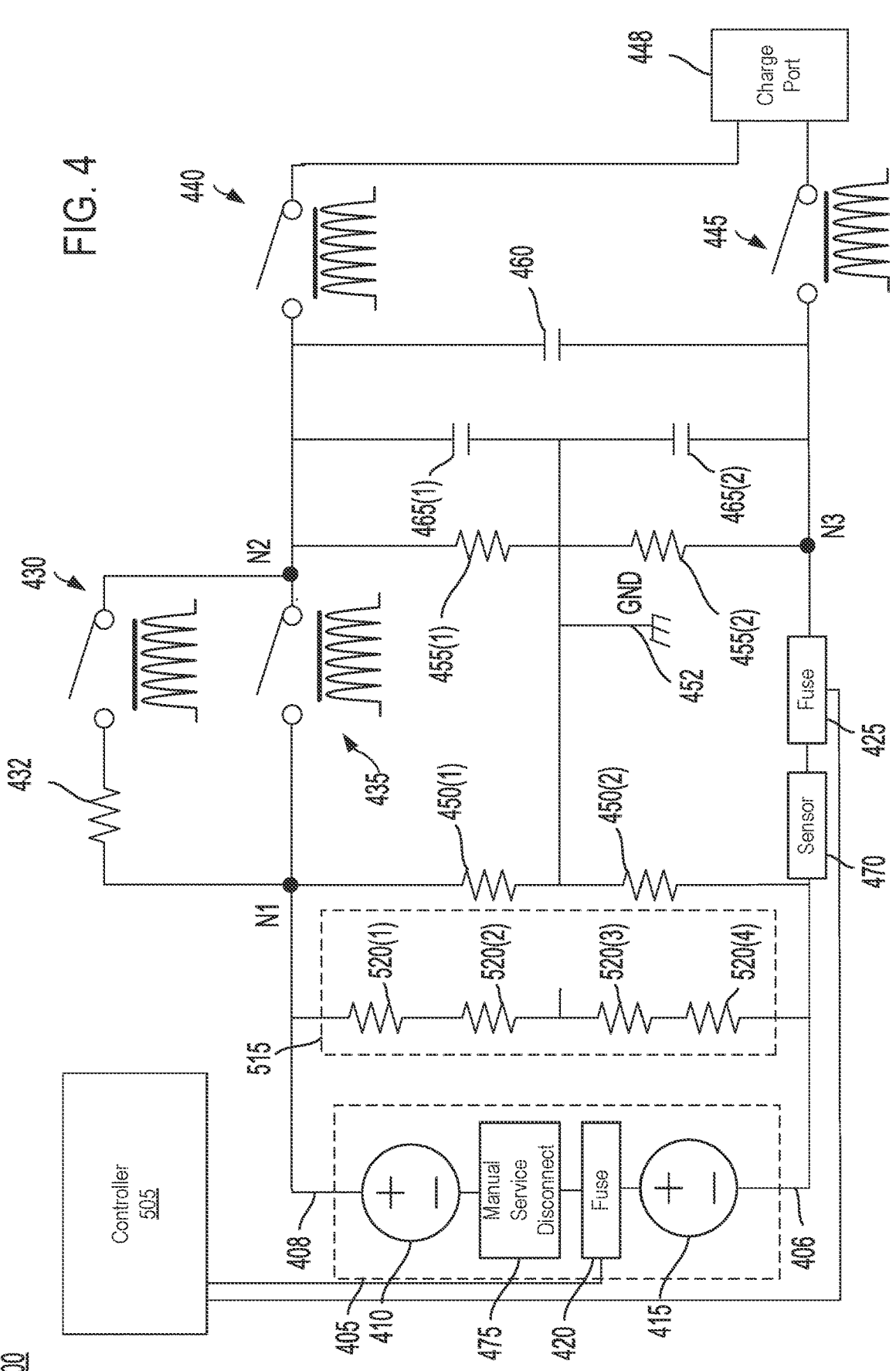
FIG. 4 depicts an example circuit diagram of a battery system 400.
Figure 5:
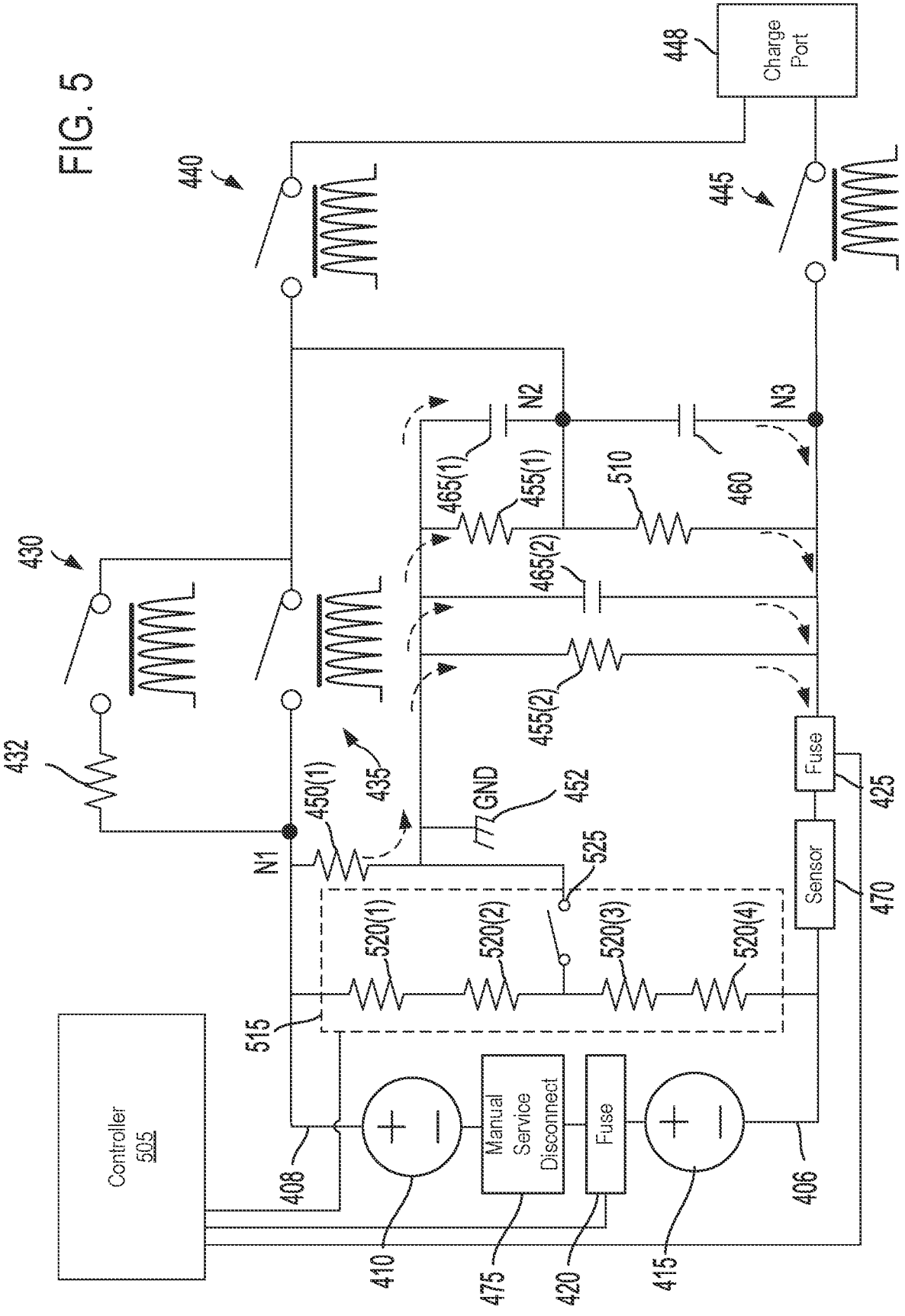
FIG. 5 depicts another example circuit diagram of the battery system of FIG. 4.

Referring now to FIG. 4 and FIG. 5, depicted are example circuit diagrams of a battery system 400. The battery system 400 can be included in the electric vehicle 105. While described as being included in the electric vehicle 105, it is noted that the battery system 400 can be implemented or used in any device, component, or element. The battery system 400 can be a high voltage (HV) battery system. For example, the battery system 400 can provide power at an output voltage of approximately 400-600V, such as 450V. In some examples, the battery system 400 can provide power at an output voltage of up to 1,000V or greater, depending on the application.

The battery system 400 can include a battery pack 405. The battery pack 405 can be similar to or include components, elements, or hardware similar to the battery pack 110 described above with reference to FIG. 1-FIG. 2B. The battery pack 405 can include a first battery cell 410 and a second battery cell 415. Each of the first battery cell 410 and the second battery cell 415 can be similar to the battery cell 120 described above. While shown with two battery cells (e.g., first battery cell 410 and the second battery cell 415), the battery pack 405 can include any number of battery cells. For example, the first battery cell 410 may be a first array of battery cells 410 and the second battery cell 415 may be a second array of battery cells 410. The battery system 400 can include a first fuse 420 connected between the first battery cell 410 and the second battery cell 415 and a second fuse 425 connected between the second battery cell 415 and a terminal of a charge port 448. For example, the first fuse 420 can be connected between a negative terminal of the first battery cell 410 and a positive terminal of the second battery cell 410. The second fuse 425 can be connected between a negative germinal of the second battery cell 410 and a negative terminal of the charge port 448. The battery system 400 can include a controller 505 communicably coupled to the first fuse 420 and the second fuse 425. The controller 505 can generate signals for blowing, popping, triggering, or otherwise activating one or more of the first fuse 420 and the second fuse 425 responsive to an event. The first fuse 420 and the second fuse 425 can supplement, supplant, or replace a main negative switch at the negative terminal 406 of the battery pack 405. For example, some battery systems can include both a main positive switch 435 and a main negative switch. In the battery system 400 described herein, the main negative switch may not be included, can be omitted or otherwise excluded from the battery system 400.

The first fuse 420 can be connected in series between the first battery cell 410 and the second battery cell 415. For instance, the first fuse 420 can be connected in series with a negative terminal of the first battery cell 410 and a positive terminal of the second battery cell 415. The first fuse 420 and second fuse 425 can be, or include, pyrofuses. The pyrofuses can be, or include, a fuse which can be blown, popped, or otherwise triggered, to disrupt or otherwise interrupt current or power flowing through the fuse. The pyrofuses can be permanently triggered such that, once the pyrofuses are triggered to open the circuits, the pyrofuses are replaced to close the circuit. While described as pyrofuses, any other suitable type of fuse can be used in the battery system 400. The controller 505 can control the actuation of the first fuse 420 and the second fuse 425, to trigger the fuses based on, according to, or responsive to one or more events. The controller 505 can control the first fuse 420 and the second fuse 425 by sending a signal to the respective fuses to trigger the fuses to interrupt current or power flowing through the fuses.

The battery system 400 can include one or more switches. For example, the battery system 400 can include a pre-charge switch 430, the main positive switch 435, a positive charge switch 440, and a negative charge switch 445. One or more of the pre-charge switch 430, main positive switch 435, positive charge switch 440, and negative charge switch 445 can include a magnetically controlled switch and an inductor. The inductor, responsive to receiving power or an electrical signal, can induce a magnetic field which opens or closes the magnetically controlled switch. When the inductor induces the magnetic field to close the magnetically controlled switch, the magnetically controlled switch can be in a "closed" state. When the inductor is not charged or otherwise does not induce the magnetic field to close the magnetically controlled switch, the magnetically controlled switch can be in an "open" state. The inductor can receive the power/electrical signal from the controller 505. While this example of a switch is described, it is noted that any form or type of switch can be implemented within the battery system 400.

The main positive switch 435 can be connected to a positive terminal 408 of the battery pack 405. For example, the main positive switch 435 can be connected to a first node N1, which is also connected to the positive terminal of the first battery cell 410. The main positive switch 435 can be connected between the positive terminal of the battery pack 405 and a second node N2, which is also connected to a positive terminal of a charge port 448. In other words, the main positive switch 435 can be connected between the first node N1 and the second node N2.

The pre-charge switch 430 can be connected in parallel with the main positive switch 435 between the nodes N1 and N2. As such, the pre-charge switch 430 can also be connected to the positive terminal of the battery pack 405. In some instances, a pre-charge resistor 432 can be arranged in series between the positive terminal of the battery pack 405 and the pre-charge switch 430. The pre-charge switch 430, together with the pre-charge resistor 432, can form a pre-charge circuit. The pre-charge switch 430 can divert, manage, or otherwise control delivery of power from the battery pack 405 to the pre-charge resistor 432, to charge one or more capacitors of the battery system 400. The pre-charge switch 430 can control delivery of power to the pre-charge resistor 432 to charge one or more of the capacitors prior to power being delivered from the charge port 448 to the battery pack 405 to charge the batteries. By charging one or more of the capacitors, the one or more capacitors can filter power delivered from the charge port 448. The pre-charge switch 430 and the main positive switch 435 can be connected to an output (e.g., an output terminal) of the positive charge switch 440. In other words, the main positive switch 435 can be connected, with a first terminal connected to the first node N1 shared with the positive terminal 408 of the battery pack 405 and the pre-charge resistor 432, and a second terminal connected to the second node N2 shared with the output terminal of the positive charge switch 440 and a terminal of the pre-charge switch 430.

The positive charge switch 440 and the negative charge switch 445 can be connected to positive and negative outputs of the charge port 448. The charge port 448 can receive an adapter, device, or connector which delivers power (e.g., from an external power source) to the battery pack 405, to charge the battery cells 410, 415. The charge port 448 can deliver DC or AC power to the battery pack 405 through the positive charge switch 440 and the negative charge switch 445. The positive charge switch 440 can be connected between the positive output of the charge port 448 and the second node N2. The negative charge switch 445 can be connected between the negative output of the charge port 448 and the second fuse 425. In this regard, a negative terminal switch may not be included between the negative charge switch 445 and the negative terminal of the battery pack 405. Instead, the first fuse 420 and the second fuse 425 can at least partially replace the negative terminal switch.

The battery system 400 can include one or more isolation resistors. The isolation resistors can represent paths during leakage from a high voltage domain (e.g., voltage of the battery pack 405) to a low voltage domain. In this regard, the isolation resistors may not be hardware resistors. Instead, the isolation resistors can be representative paths during leakage. The isolation resistors can include battery pack isolation resistors 450(1), 450(2), and vehicle load isolation resistors 455(1), 455(2). The battery pack isolation resistors 450(1), 450(2) can isolate the battery pack 405 from vehicle loads. The battery pack isolation resistors 450(1), 450(2) can be represented at the positive terminal 408 and the negative terminal 406 of the battery pack 405. For example, the battery pack isolation resistor 450(1) can be arranged or represented at to the positive terminal 408, and the battery pack isolation resistor 450(2) can be arranged or represented at the negative terminal 406 of the battery pack 405. The battery pack isolation resistor 450(1) can represent a path between the positive terminal and ground 452. The battery pack isolation resistor 450(1) can be connected to the positive terminal at the first terminal of the main positive switch 435 (e.g., connected to the first node N1). The battery pack isolation resistor 450(2) can represent a path between the negative terminal of the battery pack 405 and ground 452. The battery pack isolation resistor 450(1) can have a resistance value of, for example, greater than 10 MΩ. The battery pack isolation resistor 450(2) can have a resistance value of, for example, between 1-10 MΩ. While these resistances are provided, it is noted that, depending on the particular arrangements of the battery system 400, the battery pack isolation resistors can have various other resistance values.

The vehicle load isolation resistor 455(1) can be arranged or represented as connected to the second node N2. In this regard, the vehicle load isolation resistor 455(1) can share the second node N2 with the second terminal of the main positive switch 435 and the output of the positive charge switch 440. The vehicle load isolation resistor 455(1) can be connected between the second node N2 and ground 452. The vehicle load isolation resistor 455(2) can be arranged at or connected between a third node N3, which is shared with the second fuse 425 and the output of the negative charge switch 445, and ground 452. The vehicle load isolation resistors 455(1), 455(2) can have a resistance value of between 1-10 MΩ. While these resistances are provided, it is noted that, depending on the particular arrangements of the battery system 400, the vehicle load isolation resistors can have various other resistance values.

The battery system 400 can include one or more load capacitors. The load capacitors can filter voltages delivered from the battery system 400 to vehicle loads (e.g., of the electric vehicle 105). The load capacitors can include an X-load capacitor 460 and two Y-load capacitors 465(1), 465(2). The X-load capacitor 460 and Y-load capacitors 465(1), 465(2) can be arranged in parallel with one another. Terminals of the X-load capacitor 460 can be connected between the second node N2 and the third node N3. In other words, the X-load capacitor 460 can be connected to the second node N2 with the vehicle load isolation resistor 455(1), and connected to the third node N2 with the vehicle load isolation resistor 455(2). The Y-load capacitors 465(1), 465(2) can be high and low Y-load capacitors, respectively (e.g., for high and low voltages, respectively). The Y-load capacitors 465(1), 465(2) can be arranged in parallel with the vehicle load isolation resistors 455(1), 455(2). Terminals of the Y-load capacitor 465(1) can be connected between the second node N2 and ground 452. Similarly, terminals of the Y-load capacitor 465(2) can be connected between the third node N3 and ground 452. The X and Y-load capacitors 460, 465 can be capacitors which are connected between the battery system 400 and loads of the electric vehicle 105 (e.g., electrical loads such as vehicle motors). The X-load capacitor 460 can have a capacitance of, for example, between 2-3 mF. The Y-load capacitors 465(1), 465(2) can have a capacitance of, for example, 1-10 μF While these capacitance values are provided, it is noted that, depending on the particular arrangements of the battery system 400, the X-load capacitor 460 and Y-load capacitors 465(1), 465(2) can have various other capacitance values.

The battery system 400 can include one or more sensors. For example, the battery system 400 can include a sensor 470. The sensor 470 can be a current sensor, probe, or ammeter, which measures a current draw of the battery system 400. The sensor 470 can be connected in series between the fuse 425 and the negative terminal 406 of the battery pack 405. The sensor 470 can sample, measure, or otherwise quantify a current of the battery pack 405, based on measurements of current flow to the negative terminal 406 of the battery pack 405. While shown at the negative terminal 406, the sensor 470 can be located at various other positions within the battery system 400. The sensor 470 can transmit, send, or otherwise provide current measurements to the controller 505. The battery system 400 can include additional sensors. For example, the battery system 400 can include one or more temperature sensors, such as a thermometer, arranged to sample, measure, or otherwise quantify a temperature of the battery pack 405. The temperature sensors can be arranged to sample a temperature at various locations within the battery pack 405, including internal or ambient temperatures. As another example, the battery system 400 can include one or more accelerometers, such as an inertial measurement unit (IMU) or gyroscope, arranged to detect, measure, or otherwise quantify an acceleration of the battery pack 405.

The battery system 400 can include a manual service disconnect 475. The manual service disconnect 475 can be, or include, a manually controlled switch, contact, or other disconnect, which disconnects or otherwise breaks a connection between battery cells 410, 415 of the battery pack 405. The manual service disconnect 475 can be arranged in series between the first battery cell 410 and second battery cell 415 of the battery pack 405. The manual service disconnect 475 can be connected between the fuse 420 and one of the battery cells 410, 415. For example, and as shown in FIG. 4, the manual service disconnect 475 can be connected between the fuse 420 and the negative terminal 406 of the first battery cell 410. As another example, the manual service disconnect 475 can be connected between the fuse 420 and the positive terminal of the second battery cell 415.

Referring still to FIG. 4 and FIG. 5, the battery system 400 can include the controller 505. The controller 505 can be, or include, elements similar to the computing system 300 of FIG. 3. The controller 505 can be communicably coupled to the fuses 420, 425 and the switches 430-445, and sensors (such as sensor 470) of the battery system 400. The controller 505 can communicate one or more signals to the fuses 420, 425 and switches 430-445, to control a flow of power through the battery system 400. The controller 505 can communicate the one or more signals responsive to detecting or otherwise identifying an event. For example, the event can include a service event, or some other event in which power of the electric vehicle 105 is to be dissipated. The controller 505 can detect or identify the event based on a signal from a sensor or some other component of the electric vehicle 105, such as the sensor 470, an electronic control unit (ECU) of the electric vehicle 105, or any other component.

The X-load capacitor 460 may include one or more bleeding resistors 510. While shown as a single bleeding resistor 510, it is noted that the battery system 400 can include any number of bleeding resistors 510. The bleeding resistors 510 can be or include components or elements of the vehicle 100 high voltage (HV) components, which facilitate discharging of electric charge in the x-load capacitor 460. The bleeding resistors 510 can be arranged in parallel with the X-load capacitor 460. As such, the bleeding resistors 510 can be connected between the second node N2 and the third node N3. The bleeding resistors 510 can discharge electric charge stored in the X-load capacitor 460 where the battery system 400 is turned off. The battery system 400 can also include a battery management system 515 including one or more resistors 520 (e.g., resistors 520(1)-520(4)) which form an isolation detection circuit. The battery management system 515 can be incorporated into and/or a component of the controller 505. While these components of the battery management system 515 are shown, it is noted that other components can be implemented within the battery management system 515. The resistors 520 can be arranged or connected in various configurations to isolate the battery pack 405 from the HV vehicle 105 components. The battery management system 515 can include a ground switch 525 (such as a chassis ground switch) connected between the second and third resistors 520(2), 520(3) and ground 452 (such as a chassis of the electric vehicle 105), another switch 600 can be arranged in series between the third resistor 520(3) and fourth resistor 520(4), and so forth.

Referring again to FIG. 4, in operation, when the first battery cell 410 and the second battery cell 415 of the battery pack 405 are connected to the charge port 448 for charging, the controller 505 can initially send a signal to the pre-charge switch 430, to close the pre-charge switch 430, while maintaining the main positive switch 435, the positive charge switch 440, and negative charge switch 445 in an open state, to pre-charge the capacitors 460-465 using power from the battery pack 405. Once charged (e.g., to above a threshold charge or charge level, charged for a predetermined duration), the controller 505 can send one or more signals to close the positive charge switch 440, the main positive switch 435, and the negative charge switch 445, while opening the pre-charge switch 430. Power (e.g., direct current) then flows from the charge port 448 to charge the battery cells 410, 415 of the battery pack 405. When the battery cells 410, 415 of the battery pack 405 are charged (e.g., to above a threshold level), the controller 505 can send a signal to open the main positive switch 435, the positive charge switch 440, and the negative charge switch 445, to disconnect the battery cells 410, 415 of the battery pack 405 from the charge port 448.

Referring again to FIG. 5, in operation, when the controller 505 controls the battery system 400 to deliver power from the battery pack to the vehicle load(s) (such as the electric motor(s) of the electric vehicle 105), the controller 505 can send signals to close the main positive switch 435, while opening the pre-charge switch 430, the positive charge switch 440, and the negative charge switch 445. Power then flows from the battery pack 405 through the main positive switch 435 to the second node N2, to deliver power to the vehicle load(s). Voltage levels on the X-load capacitor 460 can be maintained below a threshold voltage, such as 60 VDC, using the drive unit backup DC/DC converter 605 (of FIG. 6), which can be in vehicle sleep mode. In this regard, where an event is not detected or registered, the controller 505 can open and close the main positive switch 435 to connect or disconnect the battery pack 405 to the vehicle loads. For example, to deliver power from the battery pack 405 to vehicle loads (such as the electric motor(s) of the electric vehicle 105), the controller 505 can send a signal to close the main positive switch 435 upon completion of pre-charging of the capacitors 460-465. When closed, power can flow from positive terminal 406 of the battery pack 405 through the main positive switch 435 to the vehicle loads. Similarly, when the electric vehicle 105 is turned off, the controller 505 can send a signal to open the main positive switch 435. When open, power may not flow from the positive terminal 406 of the battery pack 405 to the vehicle loads. Instead, power from various capacitors of the battery system 400 may be dissipated (e.g., to ground 452 and/or via the drive unit back-up DC/DC converter 605, and/or via the bleeding resistor(s) 510).

In some instances, since the battery system 400 may not include a main negative switch, when the main positive switch 435 is opened, power can still flow (e.g., along the path illustrated by the dotted arrows) from the battery pack 405 through the isolation resistor 450(1) to charge the X-load capacitor 460 and Y-load capacitors 465. The charge of the capacitors 460, 465 can depend on the resistance status of the isolation resistors 450, 455. Such instances can cause power to remain within the battery system 400 after the electric vehicle 105 is turned off (e.g., and the main positive switch 435 is opened).

In some instances, the controller 505 can detect, register, or otherwise identify an event. The controller 505 can identify the event based on a signal received from a sensor or another vehicle controller. For instance, the controller 505 can identify the event based on a signal or measurement from a current sensor (such as an ammeter), a temperature sensor, an accelerometer, user input, or in other ways, satisfying a threshold criteria. As one example, the controller 505 can identify a current event based on a current measurement from the current sensor satisfying a threshold criteria (e.g., being greater than or equal to a threshold current, such as 1000 A). As another example, the controller 505 can identify a temperature event based on a temperature measurement from the temperature sensor satisfying a threshold criteria (e.g., being greater than or equal to a threshold temperature, such as 60° C.). As yet another example, the controller 505 can identify an acceleration event based on an acceleration measurement from the accelerometer satisfying a threshold criteria (e.g., being greater than or equal to a threshold acceleration, such as 50 m/s$^2$).

The controller 505 can identify an event based on actuation of a switch or other user input. For example, the event can be or include a service event, in which the electric vehicle 105 is being serviced. A servicer or maintenance operator can actuate a switch or otherwise provide a corresponding user input to indicate (e.g., to the controller 505) that the electric vehicle 105 is being serviced. In some examples, the controller 505 can identify the service event responsive to removal of the manual service disconnect 475. For example, the servicer or maintenance operator can remove the manual service disconnect 475 prior to performing any electric vehicle 105 servicing. The controller 505 can detect or otherwise identify disconnection of the manual service disconnect 475 (e.g., based on a signal from a contact switch communicably coupled to the manual service disconnect 475, or some other component which detects removal of the manual service disconnect 475). The controller 505 can identify the service event responsive to detecting disconnection of the manual service disconnect 475.

The controller 505 can identify a main positive event based on an attempt of opening the main positive switch 435. For example, the controller 505 can identify the event responsive to detecting that the main positive switch 435 remains closed after the controller 505 sends or otherwise transmits an open signal to the main positive switch 435. The controller 505 can transmit an open or close signal to open or close the main positive switch 435, as part of charging or discharging the battery pack 405. The controller 505 can identify the event responsive to sending, for example, an open signal to the main positive switch 435 and detecting that the main positive switch 435 remains closed.

Figure 6:
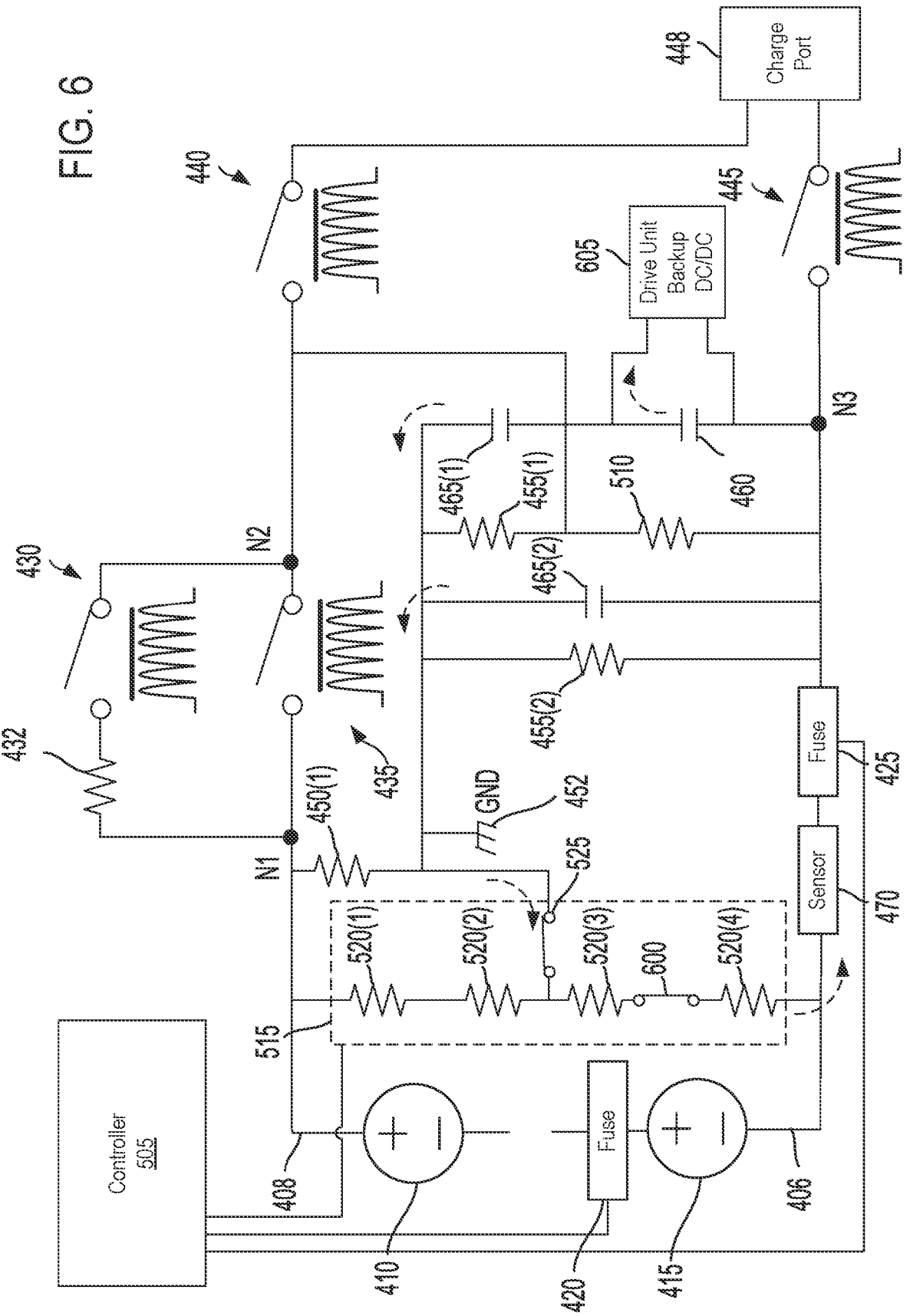
FIG. 6 depicts an example circuit diagram of the battery system of FIG. 4 during a service event.

Referring now to FIG. 6, in operation, when the service event is identified (e.g., based on actuation of the main service disconnect 475 or a signal received by the controller 505 from some other source), the controller 505 can control the ground switch 525 and the switch 600 to close, while maintaining the main positive switch 435, the positive charge switch 440, and the negative charge switch 445 in an open state. Power can thus flow from the X-load and Y-load capacitor(s) 460-465 to ground 452 (e.g., along the path illustrated by the dotted arrows), thereby dissipating charge from the X-load and Y-load capacitors 460-465. In some instances, the controller 505 can control a drive unit converter, such as a drive unit backup DC/DC converter 605 to (e.g., actively) discharge the X-load capacitor 460. The controller 505 can control the drive unit converter to discharge the X-load capacitor 460 while the controller 505 controls the ground switch 525 and switch 600 as described above (e.g., at the same time), to cause discharging of the X-load capacitor 460 (e.g., via the drive unit converter) and Y-load capacitors 465 along the dotted arrows. The drive unit backup DC/DC converter 605 can be one of the loads the electric vehicle 105, and used by the controller 505 to quickly discharge the X-load capacitor 460 (as compared to dissipating power from the X-load capacitor 460 to ground 452 as described herein). Once the X-load capacitor 460 and Y-load capacitors 465 are discharged to below a threshold level (e.g., as detected or indicated via a service port to a service or maintenance operator), the electric vehicle 105 can be serviced.

The controller 505 can actuate, deploy, or otherwise control one or more of the fuses 420, 425 responsive to detecting an event, such as a temperature event, acceleration event, a current event, and/or a main positive event. The controller 505 can send one or more signals to the switches 430-445 and/or fuses 420, 425, to open the circuit of the battery system 400 at various points, to dissipate power from the vehicle loads and the capacitor(s) 460-465 to ground 452. For example, in response to an event, the controller 505 can send a signal to the first fuse 420 and second fuse 425 to open the circuit. When the first and second fuse 420, 425 are opened, the X-load capacitor 460 can be discharged to ground 452. In some instances, the controller 505 can send a signal to one of the first fuse 420 or second fuse 425, which can still cause discharging of the X-load capacitor 460. In some instances, in response to an event, the controller 505 can open the main positive switch 435 in addition to the first and second fuse 420, 425.

The controller 505 can selectively open one or both of the first fuse 420 and second fuse 425 depending on the event detected by the controller 505. For example, where the event is a current event (e.g., responsive to a current measurement from the current sensor satisfying a threshold criteria), the controller 505 can selectively open the first fuse 420 and the second fuse 425. As another example, where the event is an acceleration or temperature event (e.g., responsive to a temperature or acceleration measurement from the temperature/acceleration sensor satisfying a corresponding threshold criteria), the controller 505 can selectively open the first fuse 420 and the second fuse 425. By opening the first fuse 420 and the second fuse 425, power may not flow from the battery pack 405 to loads of the electric vehicle 105. Instead, power stored in the capacitor(s), such as the Y-load capacitor 465, can be discharged or dissipated within the battery system 400 to ground 452. In some instances, the drive unit back-up DC/DC converter 605 can actively discharge the X-load capacitor 460 in the arrangement where the first fuse 420 and second fuse 425 are open. By actively discharging the X-load capacitor 460, power of the battery system 400 can be dissipated more quickly.

The controller 505 can selectively open one of the first fuse 420 and the second fuse 425 based on a triggering value corresponding to the event detected by the controller 505. For instance, where the event is a current event, the controller 505 can selectively open one of the first fuse 420 or the second fuse 425 depending on the current value sensed by the sensor 470. As an example, the controller 505 can selectively open the second fuse 425 (while foregoing or omitting opening the first fuse 420) responsive to the current value sensed by the sensor 470 being within a range of current values (e.g., between 1000-2000 A). The controller 505 can open both the first fuse 420 and the second fuse 425 responsive to the current value sensed by the sensor 470 being outside of (e.g., exceeding 2 kA) the range of current values. While described with reference to current values, it is noted that similar temperature values can cause the controller 505 to selectively open one and/or both of the first fuse 420 and the second fuse 425.

Figures 7, 8:
FIG. 7 depicts a flowchart showing an example method of providing a battery system.
FIG. 8 depicts a flowchart showing an example method of controlling a battery system.

Referring now to FIG. 7, depicted is a flowchart showing an example method 700 of providing the battery system 400. The method 700 is being described with reference to the elements, components, or hardware described above with reference to FIG. 4-FIG. 6, among others. At ACT 705, the method 700 includes providing a first fuse (e.g., the first fuse

420). At ACT 710, the method 700 includes providing a second fuse (e.g., the second fuse 425).

At ACT 705, the method 700 can include providing the first fuse 420. ACT 705 can be preceded by providing the battery pack 405. The battery pack 405 can include the first battery cell 410 and the second battery cell 415. ACT 705 can include providing the first fuse 420 in connection with the first battery cell 410 and the second battery cell 415. The first fuse 420 can be provided in a series connection between the first battery cell 410 and the second battery cell 415. The first fuse 420 can be provided in connection with a negative terminal of the first battery cell 410 and a positive terminal of the second battery cell 415. The first fuse 420 can be a pyrofuse.

The method 700 can further include an ACT of providing a main service disconnect. The main service disconnect 475 can be provided in connection between the first fuse 420 and one of the battery cells 410, 415. The main service disconnect 475 can be provided in a series connection between the first fuse 420 and one of the battery cells 410, 415. As one example, the main service disconnect 475 can be provided between the first fuse 420 and a negative terminal of the first battery cell 410. As another example, the main service disconnect 475 can be provided between the first fuse 420 and a positive terminal of the second battery cell 415.

The method 700 can further include an ACT of providing a switch 435. The switch 435 can be provided in connection with the battery 405. For example, the switch 435 can be provided in connection with the positive terminal of the battery pack 405. The switch 435 can be provided in connection with the positive terminal of the first battery cell 410 of the battery pack 405. The switch 435 can be provided in connection between the positive terminal of the first battery cell 410 and a positive terminal of a charge port 448.

At ACT 710, the method 700 can include providing the second fuse 425. The second fuse 425 can be provided in a connection with the second battery cell 415 of the battery pack 405. The second fuse 425 can be provided in a connection between the second battery cell 415 and a negative terminal of the charge port 448. Similar to the first fuse 420, the second fuse 425 can be a pyrofuse.

The method 700 can further include providing the controller 505. The controller 505 can be provided in connection with the first fuse 420, second fuse 425, and switch 435. The controller 505 can be provided, to send one or more signals to the first fuse 420, second fuse 425, and/or switch 435, to control a flow of power through the battery system 400. As described with reference to FIG. 8, the controller 505 can send one or more signals to the first fuse 420, second fuse 425, and/or switch 435 responsive to one or more events.

Referring now to FIG. 8, depicted is a flowchart showing an example method 800 of controlling the battery system 400. The method 800 is being described with reference to the elements, components, or hardware described above with reference to FIG. 4-FIG. 7, among others. At ACT 805, the method 800 includes identifying an event. At ACT 810, the method 800 includes sending a signal to a fuse of the battery system 400.

At ACT 805, the method 800 can include identifying an event. ACT 805 can include the controller 505 receiving a signal indicative of the event. The event can be a service event, or some other event of the electric vehicle 105. The controller 505 can receive the signal from one or more sensors of the electric vehicle 105. The controller 505 can receive the signal from one or more processors or computer components of the electric vehicle 105, based on a corresponding signal from one or more sensors of the electric vehicle 105. The controller 505 can receive the signal in real-time. The controller 505 can receive the signal responsive to the one or more processor(s) or computer components of the electric vehicle 105 determining occurrence of the event.

ACT 805 can include identifying the event based on a signal received from a sensor, such as a current sensor, an accelerometer, and/or a temperature sensor. The sensors may include sensors of the battery system 400 (such as the sensor 470) and/or sensors of the electric vehicle 105. The controller 505 can periodically sample, detect, or otherwise identify various sensor measurements from one or more sensors (e.g., sensor 470) of the battery system 400 and/or electric vehicle 105. The controller 505 can compare the sensor measurements to one or more thresholds, to determine whether the sample measurements satisfy a threshold criteria for identifying a corresponding event. As one example, the controller 505 can identify a current event based on a current measurement from the current sensor satisfying a threshold criteria (e.g., being greater than or equal to a threshold current, such as 1000 A). As another example, the controller 505 can identify a temperature event based on a temperature measurement from the temperature sensor satisfying a threshold criteria (e.g., being greater than or equal to a threshold temperature, such as 60° C.). As yet another example, the controller 505 can identify an acceleration event based on an acceleration measurement from the accelerometer satisfying a threshold criteria (e.g., being greater than or equal to a threshold acceleration, such as 50 m/s2).

The controller 505 can identify an event responsive to receiving a signal indicative of service of the electric vehicle 105. The signal can include actuation of a switch or other user input. A servicer or maintenance operator can actuate a switch or otherwise provide a corresponding user input to indicate (e.g., to the controller 505) that the electric vehicle 105 is being serviced. In some examples, the controller 505 can identify the service event responsive to removal of the manual service disconnect 475. For example, the servicer or maintenance operator can remove the manual service disconnect 475 prior to performing any electric vehicle 105 servicing. The controller 505 can detect or otherwise identify disconnection of the manual service disconnect 475 (e.g., based on a signal from a contact switch communicably coupled to the manual service disconnect 475, or some other component which detects removal of the manual service disconnect 475). The controller 505 can identify the service event responsive to detecting disconnection of the manual service disconnect 475.

The controller 505 can identify an event responsive to sending a signal to the main positive switch 435. The signal can be or include an open signal or command sent by the controller 505 to the main positive switch 435. For example, the controller 505 can identify the event responsive to detecting that the main positive switch 435 remains closed after the controller 505 sends or otherwise transmits an open signal to the main positive switch 435. The controller 505 can transmit an open or close signal to open or close the main positive switch 435, as part of charging or discharging the battery pack 405. The controller 505 can identify the event responsive to sending, for example, an open signal to the main positive switch 435 and detecting that the main positive switch 435 remains closed.

At ACT 810, the method 800 can include sending a signal to a fuse 420, 425 of the battery system 400. ACT 810 can include the controller 505 sending a signal to a fuse 420, 425 of the battery system 400 responsive to the event. The signal can cause the fuse to activate, to disconnect a first and second component of the battery system. In other words, ACT 810 can include the controller 505 causing the fuse 420, 425 to activate, responsive to the event identified at ACT 805. The controller 505 can cause one or more of the fuses 420, 425 to activate, responsive to the controller 505 identifying a particular type of event. For example, the controller 505 can cause one or more of the fuses 420, 425 to active responsive to the controller 505 identifying a current event, a main positive event, and/or a temperature event. The controller 505 can forego or otherwise omit activation of one or more of the fuses 420, 425 responsive to the controller 505 identifying a service event.

ACT 810 can include the controller 505 sending a signal to one of the fuses 420, 425, to activate one of the respective fuse 420, 425. The controller 505 can activate one of the respective fuses 420, 425 responsive to a sensed condition, value, or measurement being within a range. For example, the controller 505 can activate one of the respective fuses 420, 425 responsive to a current value being within a current range of 1000-2000 amperes, where 1000 amperes can be the threshold value for detecting the current event and 2000 amperes is another threshold value for activating both of the fuses 420, 425. The controller 505 can activate both of the fuses 420, 425 responsive to the current value being outside of the current range (e.g., exceeding 2000 amperes). The controller 505 can send a first signal to the first fuse 420, to disconnect the first battery cell 410 from the second battery cell 415. As another example, the controller 505 can send a second signal to the second fuse 420, to disconnect the second battery cell 410 from a node (e.g., the third node N3) which includes the connection to the negative terminal of the charge port 448.

ACT 810 can also include sending a signal to a switch (such as the switch 435). The controller 505 can send a signal to the switch 435, to open the switch 435, thereby disconnecting the positive terminal of the battery pack 405 from a node (e.g., the second node N2) which includes the positive terminal of the charge port 448. By opening the switch 435 and/or activating the first and second fuses 420, 425, power from various capacitors (e.g., the X-load and Y-load capacitors 460, 465) and vehicle loads can be dissipated to ground.

ACT 810 can include sending a signal to a vehicle load to discharge a capacitor. For example, the vehicle load can be or include the drive unit back-up DC/DC converter 605. The controller 505 can send a signal to the drive unit back-up DC/DC converter 605, to actively discharge the X-load capacitor 460. The controller 505 can send a signal to the drive unit back-up DC/DC converter 605, to actively discharge the X-load capacitor 460, while the Y-load capacitor (s) 465 are passively discharged to ground 452. The controller 505 can send the signal to the drive unit back-up DC/DC converter 605 to discharge the X-load capacitor 460 based on the type of event detected at ACT 805. For example, the controller 505 can send the signal based on Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, while described as providing a main positive switch 435 and omitting a negative switch, the battery system 400 can instead include a negative switch provided in connection between a negative terminal of a charge port and a negative terminal of the battery pack 405, with the main positive switch 435 being replaced with one or more fuses (accompanied with related configuration changes as would be understood by a person of skill in the art to provide a similar functionality). Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
   a first fuse connected between a first battery cell and a second battery cell of a battery pack;
   a second fuse connected between the second battery cell and a terminal of a charge port; and
   a controller configured to:
   detect an event based on at least one measurement; and
   activate, responsive to the event, the first fuse to disconnect the first battery cell from the second battery cell.

2. The system of claim 1, the second fuse connected to a negative terminal of the battery pack between the second battery cell and a negative terminal of the charge port, the system comprising:
   a switch connected to a positive terminal of the battery pack between the first battery cell and a positive terminal of the charge port; and
   the controller communicably coupled to the switch, the first fuse, and the second fuse, wherein the controller is configured to selectively control the switch, the first fuse, and the second fuse.

3. The system of claim 1, the first fuse comprising a first pyrofuse and the second fuse comprising a second pyrofuse, wherein the controller is configured to trigger the first pyrofuse and the second pyrofuse to permanently open a circuit including the first pyrofuse and the second pyrofuse.

4. The system of claim 1, the first fuse connected in series between the first battery cell and the second battery cell.

5. The system of claim 1, wherein the controller is configured to:

detect a signal indicative of the event based on a temperature measurement; and activate, responsive to the signal, the second fuse, to disconnect a negative terminal of the battery pack from a terminal of one or more capacitors.

6. The system of claim 1, wherein the controller is configured to:

detect a signal indicative of the event based on an acceleration measurement; and activate, responsive to the signal, the first fuse and the second fuse, to disconnect the first battery cell from the second battery cell, and to disconnect a negative terminal of the battery pack from a terminal of one or more capacitors.

7. The system of claim 1, comprising:

a drive unit converter; and the controller is configured to:

receive a signal indicative of the event;

cause, responsive to the signal, the first fuse and the second fuse to activate, to disconnect the first battery cell from the second battery cell, and to disconnect a negative terminal of the battery pack from a terminal of one or more capacitors; and cause the drive unit converter to discharge a capacitor of the one or more capacitors.

8. The system of claim 1, comprising:

a manual service disconnect connected between the first fuse and one of the first battery cell or the second battery cell.

9. A method, comprising:

providing a first fuse in connection between a first battery cell and a second battery cell of a battery pack;

providing a second fuse in connection between the second battery cell and a terminal of a charge port;

detecting, by a controller, an event based on at least one measurement; and activating, by the controller, responsive to the event, the first fuse to disconnect the first battery cell from the second battery cell.

10. The method of claim 9, the first fuse comprising a first pyrofuse, and the second fuse comprising a second pyrofuse, wherein activating the first fuse further comprises, triggering by the controller, the first pyrofuse and the second pyrofuse to permanently open a circuit including the first pyrofuse and the second pyrofuse.

11. The method of claim 9, comprising:

detecting, by the controller, a signal indicative of a current measurement;

identifying, by the controller, the event based on the current measurement satisfying a threshold criteria; and activating, by the controller responsive to identifying the event, at least one of the first fuse or the second fuse.

12. The method of claim 9, comprising:

detecting, by the controller, a signal indicative of an acceleration measurement;

identifying, by the controller, the event based on the acceleration measurement satisfying a threshold criteria; and activating, by the controller responsive to identifying the event, at least one of the first fuse or the second fuse.

13. The method of claim 9, comprising:

detecting, by the controller, a signal indicative of a temperature measurement;

identifying, by the controller, the event based on the temperature measurement satisfying a threshold criteria; and causing, by the controller responsive to identifying the event, at least one of the first fuse or the second fuse.

14. The method of claim 9, comprising:

sending, by the controller, a signal to a switch in connection with to a positive terminal of the battery pack, to open the switch;

identifying, by the controller, the event based on the switch remaining closed responsive to the signal; and activating, by the controller responsive to identifying the event, the first fuse and the second fuse.

15. The method of claim 9, comprising:

detecting, by the controller, a signal indicative of a service event; and opening, by the controller responsive to the service event, a switch in connection with to a positive terminal of the battery pack, to disconnect the positive terminal of the battery pack from one or more loads of a vehicle.

16. The method of claim 9, comprising:

detecting, by the controller, a signal indicative of the event;

opening, by the controller responsive to the signal, at least one of the first fuse, the second fuse, or a switch connected to a positive terminal of the battery pack; and causing, by the controller, a drive unit converter to discharge one or more capacitors.

17. The method of claim 9, comprising:

providing a manual service disconnect in connection between the first fuse and one of the first battery cell or the second battery cell.

18. A vehicle comprising:

a battery pack comprising a first battery cell and a second battery cell;

a first fuse connected between the first battery cell and the second battery cell;

a second fuse connected between the second battery cell and a terminal of a charge port; and a controller configured to:

detect an event based on at least one measurement; and activate, responsive to the event, the first fuse, to disconnect the first battery cell from the second battery cell.

19. The vehicle of claim 18, comprising:

a switch in connection with a positive terminal of the battery pack; and the controller in communication with the switch, the first fuse, and the second fuse, wherein the controller is configured to selectively control the first fuse, the second fuse, and the switch.

* * * * *